(12) United States Patent
Brockway

(10) Patent No.: US 7,959,375 B2
(45) Date of Patent: Jun. 14, 2011

(54) HORIZONTAL SCISSOR-TIP COMPACTION WHEEL CLEAT

(75) Inventor: Robert John Brockway, Scottsboro, AL (US)

(73) Assignee: Terra Compactor Wheel Corp., Scottsboro, AL (US)

( * ) Notice: Subject to any disclaimer, the term of this patent is extended or adjusted under 35 U.S.C. 154(b) by 56 days.

(21) Appl. No.: 12/612,082

(22) Filed: Nov. 4, 2009

(65) Prior Publication Data

US 2011/0103891 A1    May 5, 2011

(51) Int. Cl.
*E01C 19/26* (2006.01)
(52) U.S. Cl. ........... 404/121; 404/124; 301/43; 172/540
(58) Field of Classification Search .................. 404/121, 404/124; 172/540; 301/43
See application file for complete search history.

(56) References Cited

U.S. PATENT DOCUMENTS

| | | | | |
|---|---|---|---|---|
| 303,286 A * | 8/1884 | Huber | ............................. | 301/53 |
| 1,284,385 A * | 11/1918 | Linden | ............................. | 301/43 |
| 3,071,050 A * | 1/1963 | Shatto | ............................. | 404/124 |
| 3,463,063 A * | 8/1969 | Caron et al. | ............................. | 404/124 |
| 3,823,983 A * | 7/1974 | Peterson | ............................. | 301/43 |
| 4,281,945 A * | 8/1981 | Sinkkonen | ............................. | 404/121 |
| 4,808,027 A * | 2/1989 | Anderson | ............................. | 404/127 |
| 5,358,355 A | 10/1994 | Brockway | | |
| 7,198,333 B1 * | 4/2007 | Freeman | ............................. | 301/43 |

* cited by examiner

*Primary Examiner* — Raymond W Addie
(74) *Attorney, Agent, or Firm* — Ziolkowski Patent Solutions Group, SC

(57) ABSTRACT

A compactor cleat for reducing the amount of refuse build-up on the compactor wheel is disclosed. The compactor cleat includes a first tooth angled upward away from the compactor wheel in a first direction and a second tooth positioned adjacent the first tooth and being angled upward away from the compactor wheel in a second direction opposite from the first direction. The first tooth and the second tooth are formed such that an inner edge of the first tooth intersects an inner edge of the second tooth to form a scissor-shaped junction between the first tooth and the second tooth.

21 Claims, 3 Drawing Sheets

HORIZONTAL SCISSOR-TIP COMPACTION WHEEL CLEAT

BACKGROUND OF THE INVENTION

The invention relates generally to compaction machines, such as those used to compact landfills and, more particularly, to a compactor wheel on such a compaction machine having a plurality of cleats thereon for reducing the amount of refuse build-up on the compactor wheel and providing a cutting force to waste being compacted by the compactor wheel.

Compaction machines are used to compact landfill sites, garbage dumps and other such locations. These machines typically include a self-propelled vehicle having four large compactor wheels made of steel. Each compactor wheel has a hub mounted to one end of an axle and a rim disposed around and radially out from the hub. The rim typically includes an outer wrapper on which a plurality of cleats is usually mounted. The design of conventional compactor wheels, and in particular the compactor wheel cleats, varies widely. In general, the cleats are designed to compress (i.e., compact) the waste by concentrating the weight of the compaction machine on the relatively small area of the cleats. The cleats also function to break apart waste by imparting breaking forces thereon.

One problem encountered with existing cleat designs is that refuse can build-up on the cleats over time. That is, as the compactor wheel traverses the surface of the landfill and refuse is compressed by the cleats, refuse may build-up in crevices/depressions in the cleat, or may be punctured by the cleat and thereby become stuck on the cleat. Such accumulation of debris on the cleats is undesirable, as it minimizes the efficiency of the cleats with respect to its ability to impart compression and breaking forces on the waste being compacted and to provide traction to the compactor machine.

Another problem encountered with existing cleat designs is that, over time, the cleat can wear down such that an upper portion of the cleat loses its shape, thereby minimizing its efficiency. For example cleats, typically become worn down to assume a generally round configuration, which minimizes the efficiency of the cleat with respect to its ability to impart compression and cutting/breaking forces on the waste being compacted and/or to provide traction to the compactor machine.

It would therefore be desirable to provide a cleat that minimizes the build-up of refuse thereon and maintains efficiency over time regardless of wear. It would further be desirable for such a cleat to provide efficient compression and breaking forces on the waste being compacted.

BRIEF DESCRIPTION OF THE INVENTION

Embodiments of the invention provide a compactor wheel and compaction cleat mounted thereon, the compaction cleat configured to reduce the amount of refuse build-up on the compactor wheel and provide a cutting force to waste being compacted by the compactor wheel.

In accordance with one aspect of the invention, a compactor cleat mountable on a compactor wheel is provided. The compactor cleat includes a first tooth angled upward away from the compactor wheel in a first direction and a second tooth positioned adjacent the first tooth and being angled upward away from the compactor wheel in a second direction opposite from the first direction. The first tooth and the second tooth are formed such that an inner edge of the first tooth intersects an inner edge of the second tooth to form a scissor-shaped junction between the first tooth and the second tooth.

In accordance with another aspect of the invention, a compactor cleat mountable on a wrapper of a compactor wheel is provided. The compactor cleat includes a bottom portion positioned adjacent to a wrapper of a compactor wheel and a top portion joined integrally with the bottom portion and positioned thereon radially outward from the wrapper. The top portion further includes a first tooth having a sloped surface extending upward from the bottom portion to an upper ridge of the first tooth and a second tooth positioned adjacent the first tooth, with the second tooth having a sloped surface extending upward from the bottom portion to an upper ridge of the second tooth. The sloped surface of the first tooth and the sloped surface of the second tooth are angled upward from the bottom portion in opposing directions such that the upper ridge of the first tooth is positioned on an opposing edge of the compactor cleat from the upper ridge of the second tooth.

In accordance with yet another aspect of the invention, a compactor wheel mountable on an axle of a compaction machine includes a hub mountable to an axle of a compaction machine and a rim mounted around an outer circumference of the hub, with the rim having a wrapper, an inner circumferential edge, and an outer circumferential edge. The compactor wheel also includes a plurality of cleats affixed to the wrapper, with each of the plurality of cleats further including a base member having a bottom base portion and at least one support protrusion extending out from the bottom base portion and a cap positioned on the base member such that the cap is secured thereto. The cap includes a first tooth having a sloped surface and an upper ridge and a second tooth having a sloped surface and an upper ridge, with the second tooth formed relative to the first tooth such that the second tooth forms a V-shaped junction with the second tooth at a location distended radially outward from the wrapper.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION OF THE PREFERRED EMBODIMENT

Figure 1:
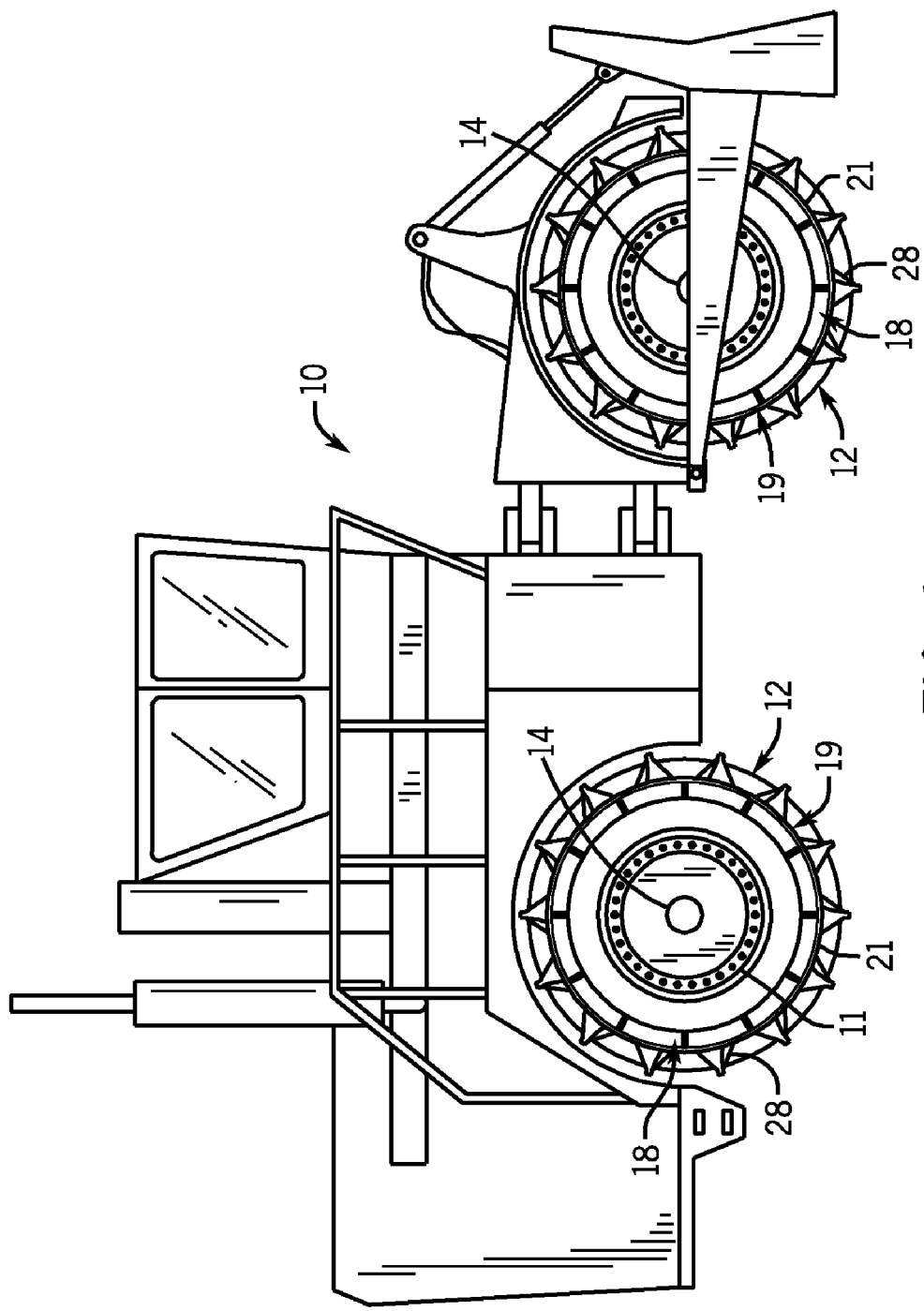
FIG. 1 is a side view of a compaction machine having compactor wheels mounted thereon for use with embodiments of the invention.

Referring to FIG. 1, a compaction machine 10 is shown and includes compactor wheels 12 mounted on the axles 14 of the compaction machine 10. The present invention is not intended to be limited to any particular type of compaction machine 10 and may be used on any suitable compaction machine. The wheels 12 include a hub 11 adapted, for example, with a plurality of bolt holes for being bolted or otherwise mounted to the axle 14. A rim 18 is mounted around the hub 11. The rim 18 includes a wrapper 19 with an outer face or surface 21 on which a plurality of cleats 28 (i.e., teeth) are mounted, such as by welding or any other suitable technique. The cleats 28 can be mounted in any of a variety of patterns, as desired, such as being aligned in a plurality of rows, for example.

Figure 2:
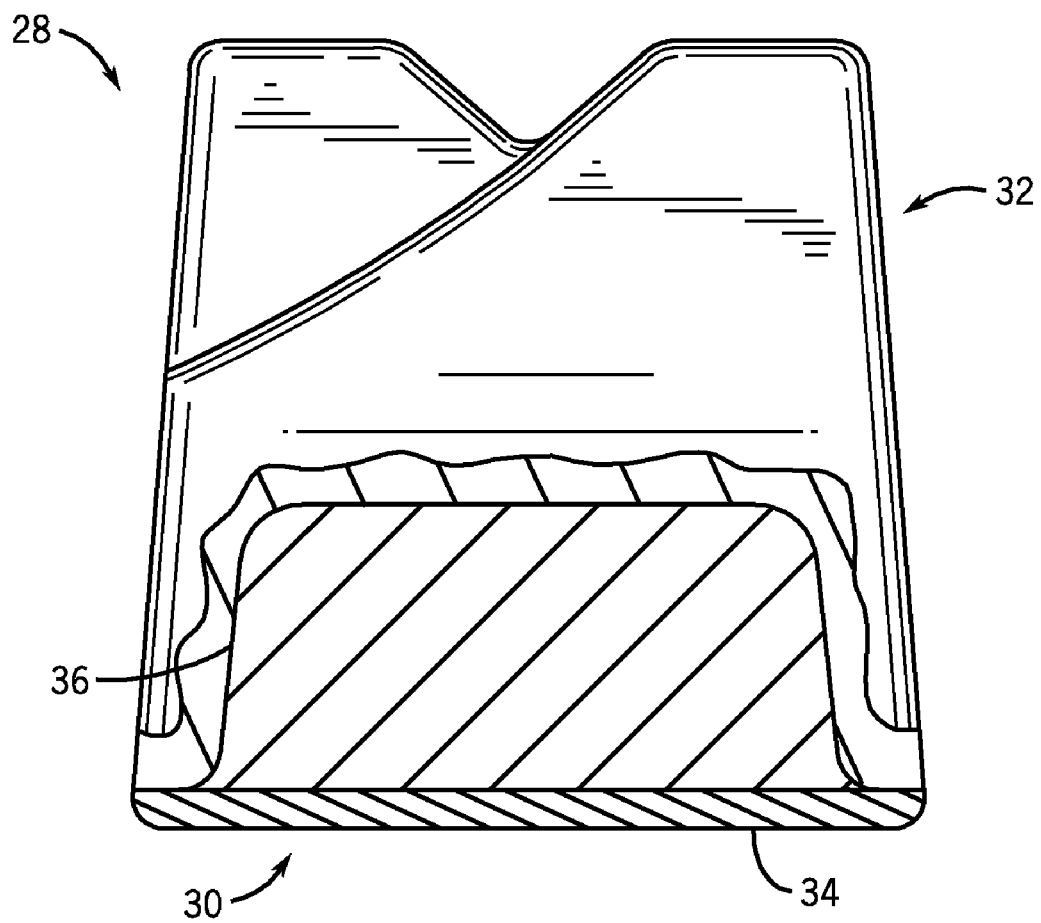
FIG. 2 is a side cross-sectional view of a cleat mountable on the compactor wheels of the compaction machine of FIG. 1 according to an embodiment of the invention.

Referring to FIG. 2, construction of cleat 28 is shown according to an exemplary embodiment of the invention. As shown in FIG. 2, cleat 28 is formed having a generally two-part construction, with a base member 30 (i.e., base) securable to wrapper 19 (FIG. 1) and a cap 32 extending radially outward from the base 30, although it is also recognized that base member 30 and cap 32 could be formed so as to constitute a single, unitary structure. As shown in FIG. 2, base 30 includes a generally planar bottom base portion 34 that is formed so as to be weldable to the wrapper 19 of compactor wheel 12 (FIG. 1) or to engage the compactor wheel in, for example, a twist-lock fashion. Base 30 also includes a protrusion 36 extending up perpendicularly from the bottom base portion 34. According to an embodiment of the invention, protrusion 36 is generally rectangular in shape and extends up perpendicularly from the bottom base portion 34 to a height lower than that of a top surface of cap 32. Protrusion 36 is positioned centrally on bottom base portion 34 and has an outer perimeter smaller than that of bottom base portion 34, such that protrusion 36 can be received within (i.e., mate with) cap 32. According to an embodiment of the invention, cap 32 is mated with base 30 to form a unitary cleat 28. Thus, cap 32 is positioned onto bottom base portion 34 and about protrusion 36 to secure cap 32 to base 30.

Figure 3:
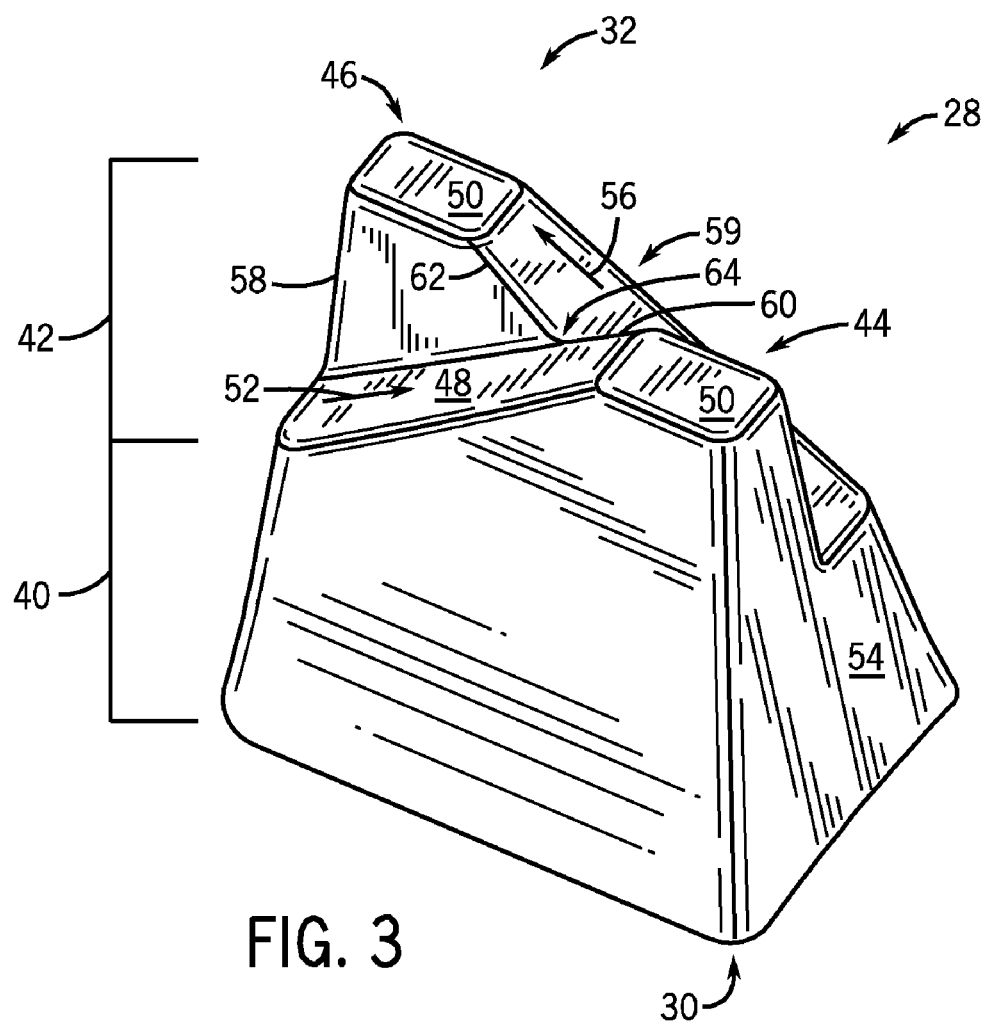
FIG. 3 is a perspective view of the cleat of FIG. 2 according to an embodiment of the invention.

Referring now to FIG. 3, a perspective view of cleat 28 is shown, and in particular cap 32 is shown. Cap 32 can be generally divided into a bottom portion 40 (i.e., first portion) and a top portion (i.e., second portion) 42. It is recognized that while bottom portion 40 and top portion 42 of cap 32 are identified separately, the portions are integrally formed so as to form a single, integral cap structure 32. The bottom portion 40 is positioned adjacent base 30 and is configured to receive protrusion 36 of base 30 therein (FIG. 2), thus mating cap 32 to base 30. Top portion 42 is positioned above bottom portion 40 and radially outward from wrapper 19 (FIG. 1).

Top portion 42 of cap 32 includes a first tooth 44 and a second tooth 46 formed thereon that are positioned in a side-by-side arrangement. While top portion 42 is described as including a first tooth 44 and a second tooth 46, it is recognized that the first and second teeth 44, 46 are in fact joined together and are formed as a single structure; however, the first tooth 44 and the second tooth 46 are separately identified so as to more clearly define the shape of top portion 42 of cap 32. As shown in FIG. 3, each of the first tooth 44 and the second tooth 46 have a generally trapezoidal profile, with a pair of top surfaces 48, 50 that face outward from wrapper 19 (FIG. 1) and provide a waste compacting surface for cleat 28. The top surfaces 48, 50 of the first and second teeth 44, 46 include a sloped surface 48 and an upper ridge 50. The sloped surface 48 extends upward from the bottom portion 40 of cap 32 (i.e., away from the base) and is angled up to the upper ridge 50, such that upper ridge 50 is formed distal from bottom portion 40. Upper ridge 50 is formed as a planar surface that is aligned parallel to the bottom base portion 34 of base 30.

As shown in FIG. 3, the first tooth 44 and the second tooth 46 are oriented in opposing directions from one another. That is, first tooth 44 is oriented such that sloped surface 48 is angled upward from bottom portion 40 in a first direction 52, leading to upper ridge 50 of first tooth 44 being positioned on a first side or edge 54 of cap 32. Conversely, second tooth 46 is oriented such that sloped surface 48 is angled upward from bottom portion 40 in a second direction 56, opposite from first direction 52, and leading to upper ridge 50 of second tooth 46 being positioned on a second side or edge 58 of cap 32. According to an exemplary embodiment of the invention, sloped surface 48 of the first tooth 44 is angled upward at an angle of between 30 and 60 degrees and sloped surface of the second tooth 46 is angled upward at an angle of between 120 and 150 degrees.

As sloped surface 48 of first tooth 44 is angled upward in a first direction 52 and sloped surface 48 of second tooth 46 is angled upward in a second direction 56, the side-by-side arrangement of the first and second teeth 44, 46 results in a scissor-shaped or V-shaped notch 59 between the teeth. That is, the opposing orientations of the first and second teeth 44, 46 results in an inner edge 60 of the first tooth 44 intersecting an inner edge 62 of the second tooth 46 to form a scissor-shaped junction 64 (i.e., V-shaped junction) between the first tooth 44 and the second tooth 46. According to an exemplary embodiment of the invention, the inner edge 60 of sloped surface 48 of first tooth 44 intersects with the inner edge 62 of sloped surface 48 of the second tooth 46 at approximately a mid-point of the sloped surface 48 of the first tooth 44 and a mid-point of the sloped surface 48 of the second tooth 46.

The arrangement of first tooth 44 relative to second tooth 46 provides for cap 32 to impart splitting/separating forces on waste forced onto cleat 28. That is, the scissor-shaped junction 64 between first tooth 44 and second tooth 46 imparts splitting/separating forces on waste pressed thereon. Waste is forced into the V-shaped notch 59 formed between the first and second teeth 44, 46, and the formation of the scissor-shaped junction 64 by inner edges 60, 62 of the first and second teeth 44, 46 splits waste forced thereon. According to an exemplary embodiment, scissor-shaped junction 64 is located radially outward from wrapper 19 (FIG. 1) and distal therefrom (i.e., distended radially outward from the wrapper), at a location set apart from the bottom portion 40 of cap 32. That is, as the inner edge 60 of sloped surface 48 of first tooth 44 intersects with the inner edge 62 of sloped surface 48 of the second tooth 46 at approximately a mid-point of the sloped surface 48 of the first tooth 44 and a mid-point of the sloped surface 48 of the second tooth 46, scissor-shaped junction 64 is formed at a location separated from bottom portion 40 of cap and set apart radially outward from wrapper 19. Scissor-shaped junction 64 thus provides a distended puncture point on cap 32 separated a distance from wrapper 19 (e.g., 6-7 inches, for example) that prevents waste/debris from accumulating on cleat 28.

As shown in FIG. 3, according to an embodiment of the invention, first and second teeth 44, 46 are formed commonly on bottom portion 40 of cap 32, thus providing an arrangement where two teeth extend from, and are formed on, a single, integral cap. First and second teeth 44, 46 are joined together and extend from bottom portion 40 so as to occupy an entirety of a surface area of cap 32/cleat 28. As such, as compactor wheel 12 (FIG. 1) traverses a landfill, waste is forced onto first and second teeth 44, 46. The waste is guided downward into V-shaped notch 59 formed between the first and second teeth 44, 46, and toward the scissor-shaped junction 64 between the first and second teeth. As waste traverses down into the V-shaped notch 59 and becomes trapped therein, the inner edges 60, 62 of the first and second teeth 44, 46 that are formed along sloped surfaces 48 and that form the scissor-shaped junction 64 between the first and second teeth 44, 46 provide a narrow cutting force having a high force per square centimeter that splits and separates waste forced onto the scissor-shaped junction. Waste is thus forced in two opposite directions upon cutting, thereby pushing waste off of the cleat 28 and preventing waste from becoming stuck thereon.

As described above, cap 32 is constructed such that scissor-shaped junction 64 (i.e., V-shaped junction) formed by/between the first tooth 44 and the second tooth 46 is located radially outward from the bottom portion 40 of cap 32, thus providing a puncture point on cap 32 set apart from wrapper 19 (FIG. 1). Beneficially, the distally located puncture point on cap 32 formed by scissor-shaped junction 64 prevents waste/debris from accumulating on cleat 28 and provides for increased life of cleat 28. That is, the construction of cap 32 including first tooth 44 and second tooth 46 provides for even wear of cap 32, while also allowing for the cap 32 to maintain its general shape. Thus, despite wear of cap 32 over time, first tooth 44 and second tooth 46 will still generally define the V-shaped notch 59 formed therebetween and scissor-shaped junction 64 will be retained. Waste will thus continue to be guided into the notch 59 and a cutting force will be applied on the waste at a distal end of cleat 28 at a location radially outward from wrapper 19 (FIG. 1) by way of scissor-shaped junction 64, thereby splitting and separating such waste. The cleat may wear down from a height of 8 inches to 4.5 inches, for example, while still providing efficient cutting forces to waste being compacted.

While cleat 28 is described above as including a base member 30 and a cap 32, it is recognized that cleat 28 could be formed as a single, unitary piece. That is, cleat could be formed of a single block of material having a bottom surface affixable to compactor wheel 12 and including first and second teeth 44, 46 extending outwardly from a top surface as set forth in detail above.

Therefore, according to one embodiment of the invention, a compactor cleat mountable on a compactor wheel is provided. The compactor cleat includes a first tooth angled upward away from the compactor wheel in a first direction and a second tooth positioned adjacent the first tooth and being angled upward away from the compactor wheel in a second direction opposite from the first direction. The first tooth and the second tooth are formed such that an inner edge of the first tooth intersects an inner edge of the second tooth to form a scissor-shaped junction between the first tooth and the second tooth.

According to another embodiment of the invention, a compactor cleat mountable on a wrapper of a compactor wheel is provided. The compactor cleat includes a bottom portion positioned adjacent to a wrapper of a compactor wheel and a top portion joined integrally with the bottom portion and positioned thereon radially outward from the wrapper. The top portion further includes a first tooth having a sloped surface extending upward from the bottom portion to an upper ridge of the first tooth and a second tooth positioned adjacent the first tooth, with the second tooth having a sloped surface extending upward from the bottom portion to an upper ridge of the second tooth. The sloped surface of the first tooth and the sloped surface of the second tooth are angled upward from the bottom portion in opposing directions such that the upper ridge of the first tooth is positioned on an opposing edge of the compactor cleat from the upper ridge of the second tooth.

According to yet another embodiment of the invention, a compactor wheel mountable on an axle of a compaction machine includes a hub mountable to an axle of a compaction machine and a rim mounted around an outer circumference of the hub, with the rim having a wrapper, an inner circumferential edge, and an outer circumferential edge. The compactor wheel also includes a plurality of cleats affixed to the wrapper, with each of the plurality of cleats further including a base member having a bottom base portion and at least one support protrusion extending out from the bottom base portion and a cap positioned on the base member such that the cap is secured thereto. The cap includes a first tooth having a sloped surface and an upper ridge and a second tooth having a sloped surface and an upper ridge, with the second tooth formed relative to the first tooth such that the second tooth forms a V-shaped junction with the second tooth at a location distended radially outward from the wrapper.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A compactor cleat mountable on a compactor wheel, the compactor cleat comprising:
   a first tooth angled upward away from the compactor wheel in a first direction; and
   a second tooth positioned adjacent the first tooth and being angled upward away from the compactor wheel in a second direction opposite from the first direction;
   wherein an inner edge of the first tooth intersects an inner edge of the second tooth to form a scissor-shaped junction between the first tooth and the second tooth.

2. The compactor cleat of claim 1 wherein the scissor-shaped junction formed between the first tooth and the second tooth is positioned radially outward from the compactor wheel.

3. The compactor cleat of claim 1 wherein each of the first tooth and the second tooth are trapezoidal shaped and wherein the cleat has a hollow bottom section to fit over a base affixable to the compactor wheel.

4. The compactor cleat of claim 3 wherein the base comprises:
   a bottom base portion; and
   a support protrusion extending up from the bottom base portion.

5. The compactor cleat of claim 4 wherein the first tooth and the second tooth form a portion of a cap, the cap comprising:
   a first portion positioned adjacent the base and configured to mate with the support protrusion to secure the cap to the base; and
   a second portion positioned above the first portion and opposite from the base, the second portion including the first tooth and the second tooth.

6. The compactor cleat of claim 5 wherein each of the first tooth and the second tooth comprises:
   a first top surface positioned distal from the first portion of the cap, the first top surface comprising a planar surface aligned parallel to the bottom base portion;
   a second top surface extending between the first portion of the cap and the first top surface, the second top surface comprising a sloped surface being angled upward from the first portion of the cap to the first top surface.

7. The compactor cleat of claim 6 wherein the first top surface of the first tooth is positioned on a first edge of the cap and the first top surface of the second tooth is positioned on a second edge of the cap opposite from the first end.

8. The compactor cleat of claim 6 wherein the second top surface of the first tooth is oriented at an angle of between 30 and 60 degrees and wherein the second top surface of the second tooth is oriented at an angle of between 120 and 150 degrees.

9. The compactor cleat of claim 5 wherein the first portion of the cap is shared by the first tooth and the second tooth.

10. The compactor cleat of claim 5 wherein the first portion of the cap includes a receptacle formed therein configured to receive the support protrusion of the base therein.

11. A compactor cleat mountable on a wrapper of a compactor wheel, the compactor cleat comprising:
a bottom portion positioned adjacent to a wrapper of a compactor wheel; and
a top portion joined integrally with the bottom portion and positioned thereon radially outward from the wrapper, the top portion comprising:
a first tooth having a sloped surface extending upward from the bottom portion to an upper ridge of the first tooth; and
a second tooth positioned adjacent the first tooth, the second tooth having a sloped surface extending upward from the bottom portion to an upper ridge of the second tooth;
wherein the sloped surface of the first tooth and the sloped surface of the second tooth are angled upward from the bottom portion in opposing directions such that the upper ridge of the first tooth is positioned on an opposing edge of the compactor cleat from the upper ridge of the second tooth.

12. The compactor cleat of claim 11 wherein the sloped surface on each of the first tooth and the second tooth comprises an inner edge, and wherein the inner edge of the sloped surface of the first tooth intersects the inner edge of the sloped surface of the second tooth to form a scissor-shaped junction between the first tooth and the second tooth.

13. The compactor cleat of claim 11 wherein the first tooth and the second tooth are positioned in a side-by-side arrangement such that an inner edge of the sloped surface of the first tooth and an inner edge of the sloped surface of the second tooth intersect to form a scissor-shaped junction between the first tooth and the second tooth.

14. The compactor cleat of claim 13 wherein the scissor-shaped junction between the first tooth and the second tooth is formed at approximately a mid-point of the sloped surface of the first tooth and a mid-point of the sloped surface of the second tooth, such that the scissor-shaped junction is set apart from the bottom portion of the compactor cleat.

15. The compactor cleat of claim 11 further comprising a base member configured to mate with the bottom portion and positioned between the bottom portion and a wrapper of the compactor wheel.

16. A compactor wheel mountable on an axle of a compaction machine, the compactor wheel comprising:
a hub mountable to an axle of a compaction machine;
a rim mounted around an outer circumference of the hub, the rim having a wrapper, an inner circumferential edge, and an outer circumferential edge; and
a plurality of cleats affixed to the wrapper, each of the plurality of cleats further comprising:
a base member including a bottom base portion and at least one support protrusion extending out from the bottom base portion; and
a cap positioned on the base member such that the cap is secured thereto, the cap further comprising a first tooth having a sloped surface and an upper ridge and a second tooth having a sloped surface and an upper ridge, the second tooth formed relative to the first tooth such that the second tooth forms a V-shaped junction with the second tooth at a location distended radially outward from the wrapper.

17. The compactor wheel of claim 16 wherein the first tooth and the second tooth are arranged such that the upper ridge of the first tooth is positioned on an opposing edge of the compactor cleat from the upper ridge of the second tooth.

18. The compactor wheel of claim 16 wherein the sloped surface of the first tooth is angled between 30 and 60 degrees and the sloped surface of the second tooth is angled between 120 and 150 degrees.

19. The compactor wheel of claim 16 wherein the first tooth and the second tooth are positioned in a side-by-side arrangement.

20. The compactor wheel of claim 16 wherein the first tooth and the second tooth comprise an inner edge formed along the sloped surface, the inner edge of the sloped surface of the first tooth intersecting with an inner edge of the sloped surface of the second tooth to form the V-shaped junction.

21. The compactor wheel of claim 20 wherein the inner edge of the sloped surface of the first tooth intersects with the inner edge of the sloped surface of the second tooth at approximately a mid-point of the sloped surface of the first tooth and a mid-point of the sloped surface of the second tooth.

* * * * *